United States Patent
Jeon et al.

(10) Patent No.: US 8,605,681 B2
(45) Date of Patent: Dec. 10, 2013

(54) METHOD OF HANDOVER BETWEEN COMMUNICATION NETWORK AND BROADCAST NETWORK FOR PROVIDING BROADCAST CONTENT, COMMUNICATION NETWORK HANDOVER CONTROLLER, AND BROADCAST NETWORK HANDOVER CONTROLLER

(75) Inventors: Hong Seok Jeon, Daejeon (KR); Eunah Kim, Daejeon (KR); Junghoon Jee, Daejeon (KR); Chang Min Park, Daejeon (KR); Hyunho Park, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 12/879,491

(22) Filed: Sep. 10, 2010

(65) Prior Publication Data

US 2011/0064049 A1    Mar. 17, 2011

(30) Foreign Application Priority Data

Sep. 11, 2009  (KR) .................. 10-2009-0085933
Sep. 3, 2010   (KR) .................. 10-2010-0086691

(51) Int. Cl.
*H04W 4/00*  (2009.01)
(52) U.S. Cl.
USPC ............................................. 370/331
(58) Field of Classification Search
USPC .......... 445/566, 436, 437; 370/331–334, 338, 370/254
See application file for complete search history.

(56) References Cited

U.S. PATENT DOCUMENTS

| | | | | |
|---|---|---|---|---|
| 2006/0234708 | A1* | 10/2006 | Aaltonen | 455/436 |
| 2006/0262751 | A1* | 11/2006 | Vermola et al. | 370/331 |
| 2007/0254659 | A1* | 11/2007 | Paul et al. | 455/436 |
| 2007/0286123 | A1* | 12/2007 | Semper | 370/331 |
| 2008/0196072 | A1* | 8/2008 | Chun | 725/105 |

FOREIGN PATENT DOCUMENTS

| | | |
|---|---|---|
| DE | 102006038337 B3 | 4/2008 |
| DE | 102008009485 A1 | 8/2009 |
| EP | 1819187 | 8/2007 |
| KR | 10-2008-0076113 | 8/2008 |
| WO | 2004/112417 | 12/2004 |

OTHER PUBLICATIONS

Ville Ollikainen, et al., A Handover Approach to DVB-H Services, p. 629-632, 2006 IEEE Xplore.

* cited by examiner

*Primary Examiner* — Chi Pham
*Assistant Examiner* — Fahmida Chowdhury
(74) *Attorney, Agent, or Firm* — Staas & Halsey LLP

(57) ABSTRACT

Provided is a method for performing handover between a communication network and a broadcast network by a handover controller of a first network corresponding to either the communication network or the broadcast network. The method for performing handover includes: searching for a second network capable of providing the same broadcast content broadcasted over the first network; performing a handover preparation procedure between the communication network and the broadcast network with a handover controller of the second network; delivering the broadcast content broadcasted over the first network to the handover controller of the second network; and sending a message requesting a terminal to watch, over the second network, the broadcast content broadcasted over the first network.

19 Claims, 7 Drawing Sheets

METHOD OF HANDOVER BETWEEN COMMUNICATION NETWORK AND BROADCAST NETWORK FOR PROVIDING BROADCAST CONTENT, COMMUNICATION NETWORK HANDOVER CONTROLLER, AND BROADCAST NETWORK HANDOVER CONTROLLER

CROSS-REFERENCE TO RELATED APPLICATION

This application claims priority to and the benefit of Korean Patent Application No. 10-2009-0085933 and 10-2010-0086691 filed in the Korean Intellectual Property Office on Sep. 11, 2009 and Sep. 3, 2010, the entire contents of which are incorporated herein by reference.

BACKGROUND OF THE INVENTION (a) Field of the Invention

The present invention relates to providing broadcast content, and more particularly, to a method of handover between a communication network and a broadcast network for providing broadcast content.

(b) Description of the Related Art

With the development of IT technologies, terminals each including both a communication network receiver and a broadcast network receiver are coming into use. Broadcast content can be provided through a communication network or a broadcast network.

A user terminal can receive paid broadcast content (e.g., a soccer match) through a communication network. At this point, if the number of users receiving the broadcast content through the communication network increases, the load on the communication network becomes heavier. A user terminal also can receive broadcast content (e.g., a baseball match) through a communication network. When the broadcast content is forcibly ended according to a regular broadcasting schedule, a user may want to continue watching the broadcast content. In these cases, a handover procedure between the broadcast network and the communication network is required.

A general handover procedure between the broadcast network and the communication network begins with a request from a terminal. That is, the terminal continues to measure radio signals in the vicinity, and reports measurement results to the currently connected network. The network having received the report on the measurement results makes a decision to perform a handover operation according to predetermined criteria, and the terminal submits a resource reservation request to a network (i.e., target network) for handover. Thereby, the terminal can continuously receive particular broadcast content by performing the handover operation between the communication network and the broadcast network and resuming the broadcast service.

However, such a general handover operation between a communication network and a broadcast network only applies to a specific terminal that has requested the handover. Accordingly, in the case that a group handover for multiple terminals is required, it is difficult to perform an appropriate handover operation due to changes in the network states.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of handover between a communication network and a broadcast network.

One exemplary embodiment the present invention provides a method for performing handover between a communication network and a broadcast network by a handover controller of a first network corresponding to either the communication network or the broadcast network, the method including: searching for a second network capable of providing the same broadcast content broadcasted over the first network; performing a handover preparation procedure between the communication network and the broadcast network with a handover controller of the second network; delivering the broadcast content broadcasted over the first network to the handover controller of the second network; and sending a message requesting a terminal to watch, over the second network, the broadcast content broadcasted over the first network.

Another exemplary embodiment the present invention provides a method for performing handover between a communication network and a broadcast network by a handover controller of a first network corresponding to either the communication network or the broadcast network, the method including: receiving, from a handover controller of a second network, a first message inquiring whether the same broadcast content broadcasted over the second network can be provided and whether there are available resources in the first network; sending, in response to the first message, a second message including information on whether the broadcast content can be provided and whether there are available resources; receiving, from the handover controller of the second network, a third message requesting preparation for provision of the broadcast content; sending, in response to the third message, a fourth message including information required for a terminal to receive the broadcast content; receiving the broadcast content delivered from the handover controller of the second network; and providing the broadcast content to the terminal.

One exemplary embodiment the present invention provides a handover controller of a first network corresponding to either a communication network or a broadcast network, which performs handover between the communication network and the broadcast network, including: a broadcast content detector for detecting broadcast content to be handed over to a second network; a second network selector for selecting at least one second network capable of providing the broadcast content with reference to information on whether the broadcast content received from a second network in the vicinity can be provided and information on whether there are available resources; and a transceiver for transmitting a preparation request message for handover to the at least one second network and transmitting a message requesting a terminal to receive the broadcast content from the at least one second network.

As a handover procedure begins at a network end, a ground handover for a plurality of terminals is possible.

If the number of users receiving broadcast content over a communication network increases, the reception of the corresponding broadcast content can be switched to a broadcast. Hereupon, the communication network operator can reduce the load on the communication network, and the users can receive the same broadcast content at a low price.

If specific broadcast content transmitted over a broadcast network is forcibly ended, the reception of the corresponding broadcast content can be switched to a communication network. Hereupon, the users can continue to receive the corresponding broadcast content.

DETAILED DESCRIPTION OF THE EMBODIMENTS

Figure 1:
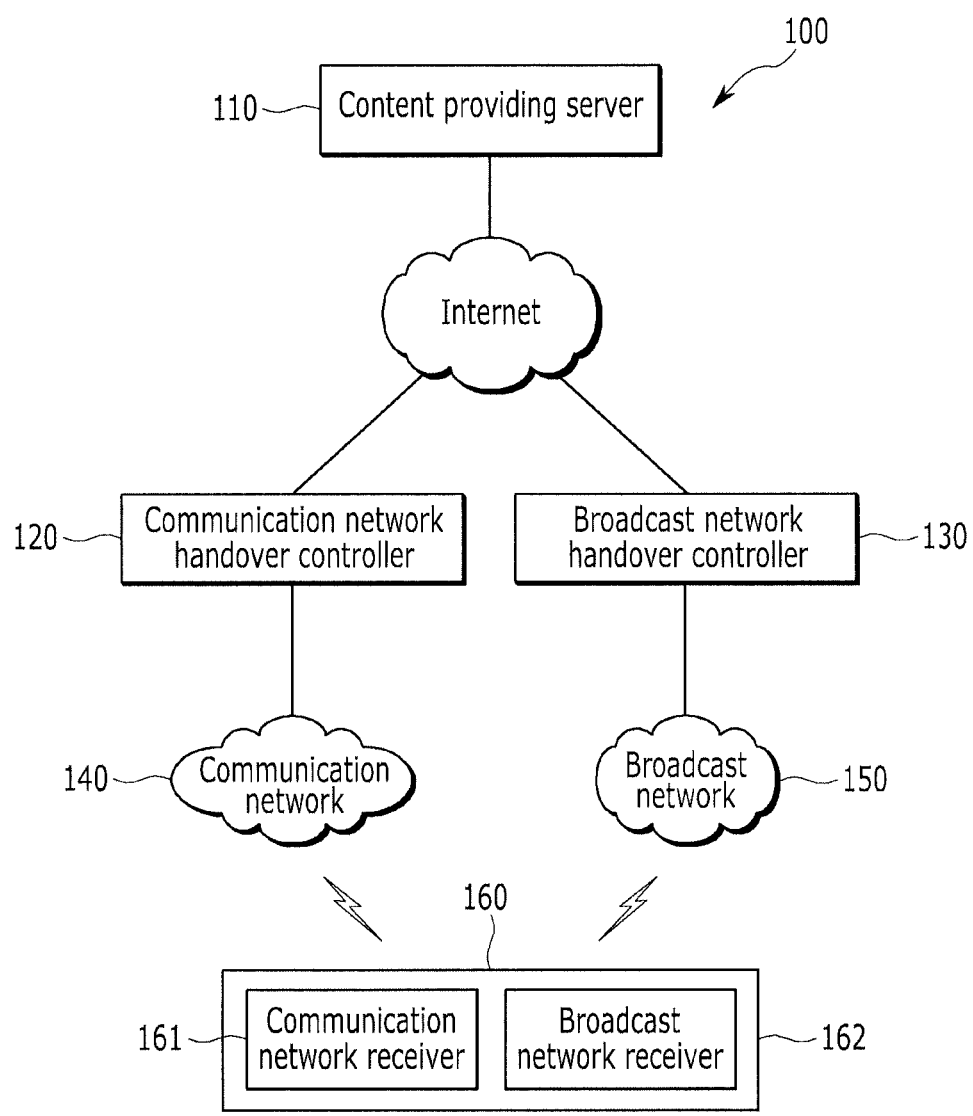
FIG. 1 is a view showing a broadcast content providing system according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. In the drawings, to clarify the present invention, parts that are not related to description are omitted, and the same parts have the same reference numerals through the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the mobile station, the mobile terminal, the subscriber station, the portable subscriber station, the user equipment, the access terminal, etc.

In the specification, an access point (AP) may designate a base station (BS), a radio access station (RAS), a node B, an evolved node-B (eNB), a base transceiver station (BTS), a mobile multihop relay (MMR)-BS, etc., and may include the entire or partial functions of the base station, the radio access station, the node B, the eNB, the base transceiver station, the MMR-BS, etc.

FIG. 1 is a view showing a broadcast content providing system according to one exemplary embodiment of the present invention.

Referring to FIG. 1, the broadcasting content providing system 100 includes a content providing server 110, a communication network handover controller 120, a broadcast network handover controller 130, a communication network 140, a broadcast network 150, and a terminal 160.

The content providing server 110 provides broadcast content to the communication network handover controller 120 and the broadcast network handover controller 130 over the internet. The broadcast content refers to media content such as real-time TV broadcast and on-demand video. The broadcast content may refer to general data files.

In a situation where terminals 160 are watching broadcast content over a communication network, when it is necessary to service the terminals through a broadcast network, the communication network handover controller 120 performs a handover procedure to the broadcast network. That is, the communication network handover controller 120 selects an appropriate broadcast network capable of providing the broadcast content, and allows the selected broadcast network to provide the broadcast content to the terminals.

In a situation where terminals 160 are watching broadcast content over a broadcast network, when it is necessary to service the terminals through a communication network, the broadcast network handover controller 130 performs a handover procedure to the communication network. That is, the broadcast network handover controller 130 selects an appropriate communication network capable of providing the broadcast content, and allows the selected communication network to provide the broadcast content to the terminals.

The communication network 140 is a mobile communication network or wireless communication network that provides a bidirectional data communication service and a broadcast service. For example, the communication network includes mobile communication networks such as 3GPP ($3^{rd}$ Generation Partnership Project) and 3GPP2 and wireless networks such as WiMAX and WLAN (Wireless Local Access Network).

The broadcast network 150 is a cable TV network, a satellite TV network, or a mobile digital broadcasting network that provides an unidirectional broadcast service. For example, the broadcast network includes DVB-H (Digital Video Broadcasting-Handheld), MediaFLO, ATSC-M/H (Advanced Television Systems Committee-Mobile/Handheld), and so on.

While the communication network handover controller 120 and the broadcast network handover controller 130 are illustrated as being separate from the communication network 140 and the broadcast network 150, respectively, the communication network handover controller 120 may be part of the components included in the communication network 140 or part of the components included in the broadcast network 150.

The terminal 160 receives broadcast content over the communication network 140 and the broadcast network 150. To this end, the terminal 160 includes both a communication network receiver 161 and a broadcast network receiver 162. The terminal 160 may be a portable mobile terminal.

Figure 2:
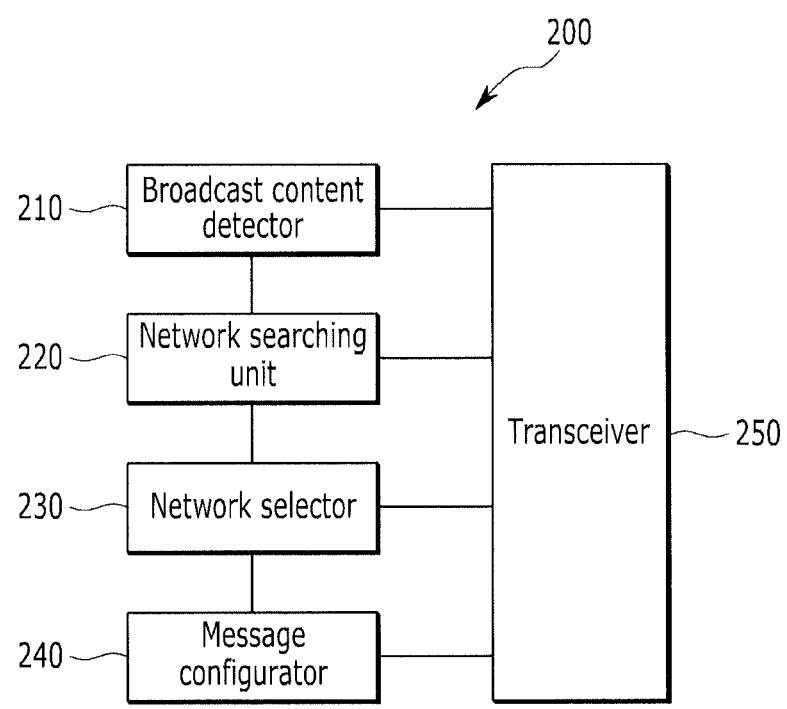
FIG. 2 is a block diagram showing a handover controller according to one exemplary embodiment of the present invention.

FIG. 2 is a block diagram showing a handover controller according to one exemplary embodiment of the present invention. The handover controller refers to a communication network handover controller 120 or a broadcast network handover controller 130. Here, a network currently providing broadcast content to a terminal is referred to as a serving network, and a network to which the terminal is to perform handover is referred to as a target network.

Referring to FIG. 2, the handover controller 200 includes a broadcast content detector 210, a network searching unit 220, a network selector 230, a message configuration unit 240, and a transceiver 250.

If the handover controller 200 is a handover controller of a serving network, the broadcast content detector 210 detects, among the broadcast content currently provided by the serving network, broadcast content that needs to be switched to a target network.

The network searching unit 220 searches for a target network capable of providing the detected broadcast content. The number of searched target networks may be one or more.

The network selector 230 selects an appropriate target network capable of detected broadcast content among the searched target networks.

The message configurator 240 configures a message to be sent to and received from the handover controller of the target network and the terminal 160 to perform a handover procedure from the serving network to the target network.

The transceiver 250 sends and receives the message configured by the message configurator 240 to and from the handover controller of the target network and the terminal 160.

On the other hand, if the handover controller 200 is a handover controller of a target network, the message configurator 240 configures a message to be sent to and received from the handover controller of the serving network and the terminal 160 to perform a handover procedure, and the transceiver 250 sends and receives the message configured by the message configurator 240 to and from the handover controller of the serving network and the terminal 160.

Hereinafter, a handover procedure from a communication network to a broadcast network will be described. If a number of terminals watch the same broadcast content over the communication network, a communication network handover controller is able to allow the broadcast network to provide the broadcast content.

Figure 3:
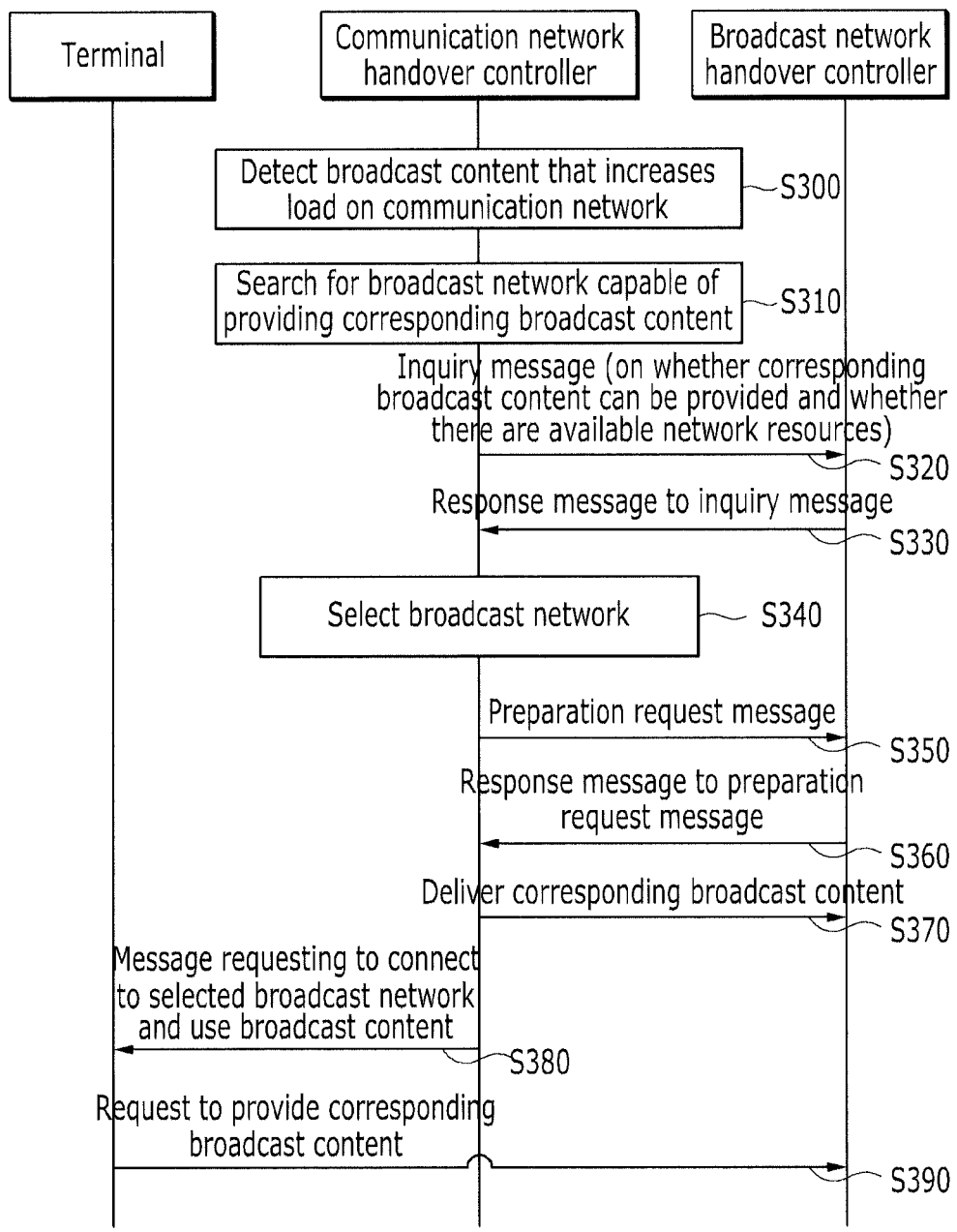
FIG. 3 is a flowchart showing a method of handover from a communication network to a broadcast network according to one exemplary embodiment of the present invention.

FIG. 3 is a flowchart showing a method of handover from a communication network to a broadcast network according to one exemplary embodiment of the present invention.

Referring to FIG. 3, the communication network handover controller 120 determines whether there is any broadcast content that increases the load on the communication network (S300). For example, if the number of terminals watching the same broadcast content exceeds a predetermined range, it is determined that the broadcast content is increasing the load on the communication network. The step S300 may be periodically or non-periodically performed.

If it is determined that there is broadcast content that increases the load on the communication network, the communication network handover controller 120 searches for a broadcast network capable of providing the broadcast content (S310). The broadcast network capable of providing the broadcast content may be a broadcast network currently providing the broadcast content or a broadcast network planning to provide the broadcast content later. The number of searched broadcast networks may be one or more.

The communication network handover controller 120 sends an inquiry message to the broadcast network handover controller 130 of the searched broadcast network (S320). When there are a plurality of searched broadcast networks, the communication network handover controller 120 can send an inquiry message to the plurality of broadcast network handover controllers 130. The inquiry message is a message that inquires whether the broadcast network can provide the broadcast content detected as increasing the load on the communication network and whether there are available network resources in the broadcast network for this service. The inquiry message may include information on the broadcast content detected as increasing the load on the communication network. For example, the information on the broadcast content may include media information and session information. The media information may include audio encoding information, video encoding information, etc., and the session information may include channel information, service identification information, address information, transmission time information, etc.

The broadcast network handover controller 130 sends a response message to the inquiry message received from the communication network handover controller 120 (S330). The response message indicates whether the broadcast network can provide the broadcast content detected as increasing the load on the communication network and whether there are available network resources.

The communication network handover controller 120 determines, with reference to the response message received from the broadcast network handover controller 130, whether the corresponding broadcast network can provide the broadcast content detected as increasing the load on the communication network to the terminal 160. When a plurality of response messages are received from a plurality of broadcast network handover controllers 130, an appropriate broadcast network is selected with reference to the received plurality of response messages (S340). At this point, at least one broadcast network can be selected.

The communication network handover controller 120 sends a preparation request message for the corresponding broadcast content to the broadcast network handover controller 130 of the selected broadcast network (S350). The preparation request message includes information on the content providing server 110 that provides the broadcast content detected as increasing the load on the communication network.

The broadcast network handover controller 130 sends a response message to the preparation request (S360), and prepares to provide the broadcast content detected as increasing the load on the communication network. The response message to the preparation request includes information required for the terminal 160 to receive the corresponding broadcast content over the broadcast network. For example, the response message to the preparation request may include information on a time at which the broadcast network provides the corresponding broadcast content and information on network resources (e.g., channels) allocated such that the broadcast network provides the corresponding broadcast content. If the corresponding broadcast content is paid content, the response message to the preparation request may include encryption information, i.e., an encryption key.

Meanwhile, when there are network resources established by prior agreement between the broadcast network operator and the communication network operator, the network resources allocated such that the broadcast network provides the corresponding broadcast content detected as increasing the load on the communication network may be network resources established by prior agreement. On the contrary, when there are no network resources established by prior agreement, the broadcast network allocates part of the network resources currently in use to provide the corresponding broadcast content. For example, the broadcast network can allocate network resources for providing broadcast content with a small number of viewers or network resources for providing broadcast content scheduled to end soonest in order to provide the broadcast content detected as increasing the load on the communication network. When the broadcast network allocates network resources currently in use, the response message to the preparation request may further include information on an expected end time of the broadcast content being provided by the allocated network resources. Therefore, the communication network provides the corresponding broadcast content to the terminal until the expected end time, and requests the broadcast network to provide the corresponding broadcast content after the expected end time. Accordingly, the problem of interruption of broadcast content provided by network resources currently in use can be avoided.

The communication network handover controller 120 delivers the broadcast content detected as increasing the load on the communication network to the broadcast network handover controller 130 (S370). If the response message to the preparation request includes an expected end time of the broadcast content currently being provided by allocated network resources, the communication network handover controller 120 can deliver the corresponding broadcast content after the expected end time.

Further, the communication network handover controller 120 sends a request message to the terminal 160 using the corresponding broadcast content over the communication network to connect to the selected broadcast network and continue to watch the corresponding broadcast content (S380). The request message includes information on the selected broadcast network. When there is one or more selected broadcast networks, the request message may include information on the one or more broadcast networks. The request message is transmitted to a plurality of terminals in a multicast or broadcast format, and requires no response message from the terminals.

The terminal 160 connects to the broadcast network selected by the communication network handover controller 120, and then requests the broadcast network handover controller to provide the corresponding broadcast content (S390). When there are a plurality of selected broadcast networks, the terminal 160 can select and connect to one of the plurality of broadcast networks.

Hereinafter, a handover procedure from a broadcast network to a communication network will be described. When it is necessary to forcibly end particular broadcast content broadcasting according to a broadcast schedule, the broadcast network handover controller enables the terminal to continue to watch the broadcast content over a communication network.

Figure 4:
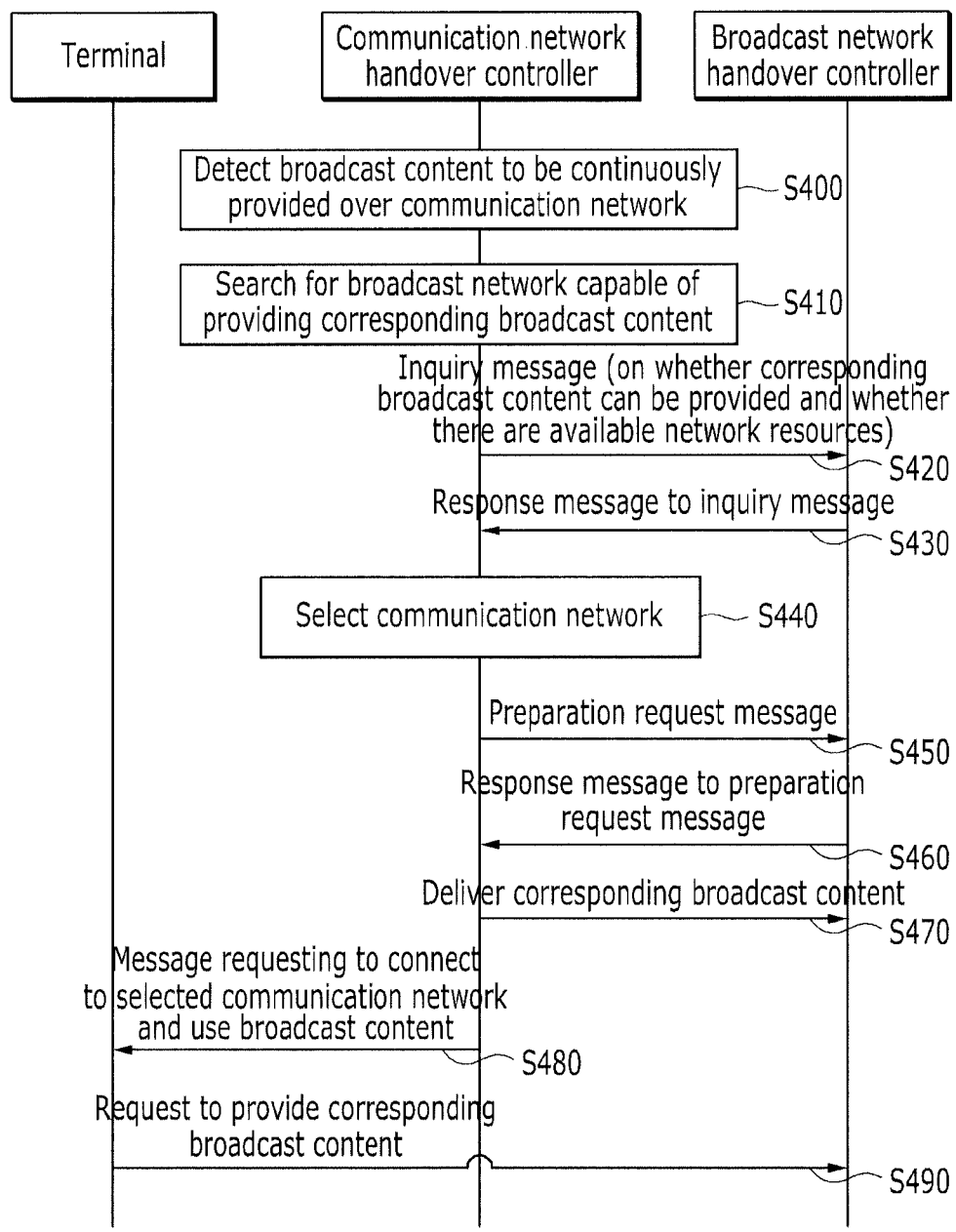
FIG. 4 is a flowchart showing a method of handover from a broadcast network to a communication network according to one exemplary embodiment of the present invention.

FIG. 4 is a flowchart showing a method of handover from a broadcast network to a communication network according to one exemplary embodiment of the present invention.

Referring to FIG. 4, the broadcast network handover controller 130 determines whether there is any broadcast content to be continuously provided over a communication network (S400). The broadcast content to be continuously provided over the communication network may be broadcast content currently being provided over a broadcast network but expected to be forcibly ended or broadcast content that has already been forcibly ended. For example, this applies to a case where a baseball game takes longer than the broadcast schedule and the broadcast of the baseball game has to be ended before the game is over. The step S400 can be periodically or non-periodically performed. At this point, the broadcast network handover controller 130 can collect information on the corresponding broadcast content. For example, the information on the corresponding broadcast content may include media information and session information. The media information may include audio encoding information, video encoding information, etc., and the session information may include channel information, service identification information, address information, transmission time information, etc.

If it is determined that there is any broadcast content to be continuously provided over the communication network, the broadcast network handover controller 130 searches for a communication network capable of providing the broadcast content (S410). The communication network capable of providing the broadcast content may be a communication network currently providing the broadcast content or a communication network planning to provide the broadcast content later. The number of searched communication networks may be one or more.

The broadcast network handover controller 130 sends an inquiry message to the communication network handover controller 120 of the searched communication network (S420). When there are a plurality of searched communication networks, the broadcast network handover controller 130 can send an inquiry message to the plurality of communication network handover controllers 120. The inquiry message is a message that inquires whether the communication network can provide the broadcast content that has been forcibly ended in the broadcast network and needs to be continuously provided over a communication network and whether there are available network resources in the communication network for this service. The inquiry message may include information on the broadcast content that needs to be continuously provided over the communication network.

The communication network handover controller 120 sends a response message to the inquiry message received from the broadcast network handover controller 130 (S430). The response message indicates whether the communication network can provide the corresponding broadcast content and whether there are available network resources.

The broadcast network handover controller 130 determines, with reference to the response message received from the communication network handover controller 120, whether the corresponding communication network can provide the broadcast content that has been forcibly ended in the broadcast network and needs to be continuously provided over the communication network to the terminal 160. When a plurality of response messages are received from a plurality of communication network handover controllers 120, an appropriate communication network is selected with reference to the received plurality of response messages (S440). At this point, at least one communication network can be selected.

The broadcast network handover controller 130 sends a preparation request message for the corresponding broadcast content to the communication network handover controller 120 of the selected communication network (S450). The preparation request message includes information on the content providing server 110 that provides the broadcast content that has been forcibly ended in the broadcast network and needs to be continuously provided over the communication network.

The communication network handover controller 120 sends a response message to the preparation request (S460), and prepares to provide the broadcast content that has been forcibly ended in the broadcast network and needs to be continuously provided over the communication network. The response message to the preparation request includes information required for the terminal 160 to receive the corresponding broadcast content over the communication network. For example, the response message to the preparation request may include information on a time at which the communication network provides the corresponding broadcast content and information on allocated network resources (e.g., channels) such that the communication network provides the corresponding broadcast content.

The broadcast network handover controller 130 delivers, to the communication network handover controller 120, the broadcast content that has been forcibly ended in the broadcast network and needs to be continuously provided over the communication network (S470). If the response message to the preparation request includes an expected end time of the broadcast content currently being provided by allocated network resources, the broadcast network handover controller 130 can deliver the corresponding broadcast content after the expected end time.

Further, the broadcast network handover controller 130 sends a request message to the terminal 160 using the corresponding broadcast content over the broadcast network to connect to the selected communication network and continue to watch the corresponding broadcast content (S480). The request message includes information on the selected communication network. When there are one or more selected communication networks, the request message may include information on the one or more communication networks. The request message is transmitted to a plurality of terminals in a multicast or broadcast format, and requires no response message from the terminals.

The terminal 160 connects to the communication network selected by the broadcast network handover controller 130, and then requests the communication network handover controller to provide the corresponding broadcast content (S490). When there are a plurality of selected communication networks, the terminal 160 can select and connect to one of the plurality of communication networks. If the terminal 160 has already been connected to the selected communication network, a separate connection procedure may not be needed.

Hereinafter, a method of handover between a communication network and a broadcast network will be described by way of example, in which a 3GPP MBMS (Multimedia Broadcast/Multicast Service) system is used as the communication network and a DVB-IPDC (IP Datacasting) system is used as the broadcast network.

Figure 5:
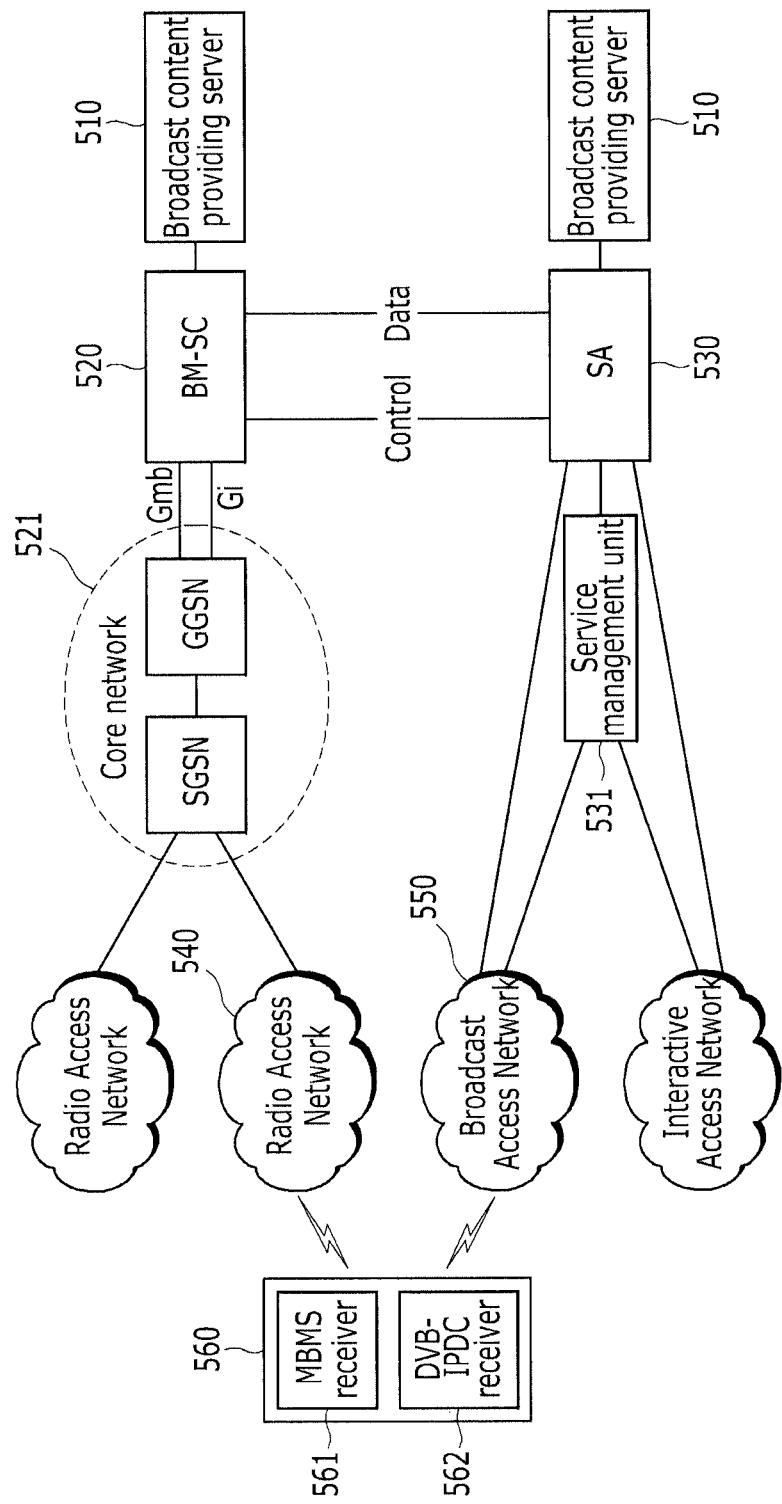
FIG. 5 is a view showing in detail a broadcast content providing system according to one exemplary embodiment of the present invention.

FIG. 5 is a view showing a broadcast content providing system according to one exemplary embodiment of the present invention in detail.

Referring to FIG. 5, a Broadcast Multicast Service Centre (BM-SC) 520, which is a communication network handover controller, receives broadcast content from a broadcast content providing server 510, and transmits the received broadcast content to terminals 560 in a broadcast or multicast transmission format. The BM-SC 520 is connected to a radio access network via a core network 521. The core network may include an SGSN (Serving GPRS Support Node) and a GGSN (Gateway GPRS Support Node).

A service application (SA) 530, which is a broadcast network handover controller, receives broadcast content from the broadcast content providing server 510, and transmits the received broadcast content to the terminals 560 in a broadcast transmission format. The SA 530 may be directly connected to a broadcast access network 550, or may be connected to the broadcast access network 550 via a service management unit 531.

A radio access network 540 of a communication network may be, for example, one of a GERAN (GSM EDGE Radio Access Network), a UTRAN (Universal Terrestrial Radio Access Network), an E-UTRAN (Evolved Universal Terrestrial Radio Access Network), and radio access networks to be developed in the future.

The broadcast access network 550 of a broadcast network may be, for example, one of a DVB-H, a T-DMB, a MediaFLO, an ATSC-M/H, and broadcast access networks to be developed in the future.

The terminal 560 includes both an MBMS receiver 561 serving as a communication network receiver and a DVB-IPDC receiver 562 serving as a broadcast network receiver, and receives broadcast content over the radio access network 540 or the broadcast access network 550.

The BM-SC 520 and the SA 530 are connected to a data interface and a control interface. In order to provide the broadcast content that has been provided to the terminal 560 over the radio access network 540 of the 3GPP MBMS system to the terminal 560 over the broadcast access network 550 of the DVB-IPDC system, the BM-SC 520 and the SA 530 perform preparation through the control interface and the BM-SC 520 delivers the corresponding broadcast content to the SA 530 through the data interface. The SA 530 provides the broadcast content delivered from the BM-SC 520 to the terminal 560 over the broadcast access network 550.

On the contrary, in order to provide the broadcast content that has been provided to the terminal 560 over the broadcast access network 550 of the DVP-IPDC system to the terminal 560 over the radio access network 540 of the MBMS system, the BM-SC 520 and the SA 530 perform preparation through the control interface and the SA 530 delivers the corresponding broadcast content to the BM-SC 520 through the data interface. The BM-SC 520 provides the broadcast content delivered from the SA 530 to the terminal 560 over the radio access network 540.

Figure 6:
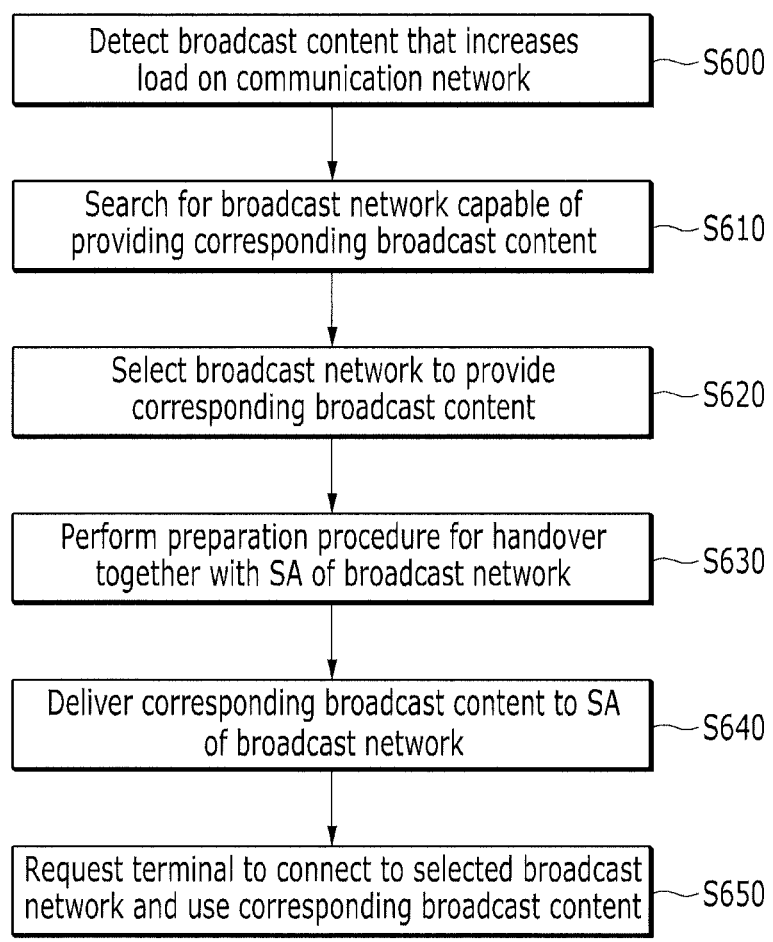
FIG. 6 is a flowchart showing a method of handover from a communication network to a broadcast network according to one exemplary embodiment of the present invention when a system supporting 3GPP MBMS (Multimedia Broadcast/Multicast Service) is used as the communication network, a DVB-IPDC (IP Datacasting) system is used as the broadcast network, and the communication network and the broadcast network support the IEEE 802.21 MIH (Media Independent Handover) function.

FIG. 6 is a flowchart showing a method of handover from a communication network to a broadcast network according to one exemplary embodiment of the present invention when a system supporting 3GPP MBMS (Multimedia Broadcast/Multicast Service) is used as the communication network, a DVB-IPDC (IP Datacasting) system is used as the broadcast network, and the communication network and the broadcast network support the IEEE 802.21 MIH (Media Independent Handover) function.

Referring to FIG. 6, the BM-SC 520 determines whether there is any broadcast content that increases the load on the communication network (S600). For example, using the multicast-mode of the MBMS, a plurality of terminals connected to the communication network can join a specific multicast session and watch the same broadcast content via multicast transmission. If both the number of terminals joining a specific multicast session and the number of base stations (e.g. RNCs (Radio Network Controllers) in a WCDMA network) servicing the terminals exceed a predetermined range, the number of branches of the multicast tree increases, and thus it can be determined that there is broadcast content that increases the load on the communication network. If the number of terminals joining a specific multicast session exceeds a predetermined range while the number of base stations servicing the terminals does not exceed a predetermined range the broadcast content may be detected as not increasing the load on the communication network because the terminals watching the corresponding broadcast content are gathered in the range of a specific base station. In the case that the IEEE 802.21 MIH (Media Independent Handover) protocol is used as one example of the method for notifying the communication network handover controller of the result that the broadcast content is detected as increasing the load on the communication network, the broadcast content can be delivered to the communication network handover controller via an MHI function entity.

When it is found that there is broadcast content that increases the load on the communication network, the BM-SC 520 searches for a broadcast network capable of providing the corresponding broadcast content (S610). In one example, the BM-SC 520 can obtain information about surrounding broadcast networks from a 3GPP ANDSF (Access Network Discovery Support Functions) server. In another example, the BM-SC 520 can obtain information about surrounding broadcast networks from an MIH information server. The information about the surrounding broadcast networks includes a list of broadcast networks that are providing the corresponding broadcast content or planning to transmit it later.

The BM-SC 520 selects an appropriate broadcast network to provide the corresponding broadcast content from a received list of surrounding broadcast networks (S620). The BM-SC 520 can send an inquiry message for handover to the SA 530, and select an appropriate broadcast network with reference to a response message received from the SA 530.

The BM-SC 520 performs a preparation procedure for handover, together with the SA 530 of the selected broadcast network, through the control interface (S630), and then delivers the corresponding broadcast content through the data interface (S640).

Then, the BM-SC 520 requests the terminals 160 using the corresponding broadcast content over the communication network to connect to the selected broadcast network and continue to watch the corresponding broadcast content (S650). An example of a request message includes using an MIH protocol message, and the following Table 1 or the following Table 2 shows an MIH_SAP (Service Access Point) Primitive.

TABLE 1

| MIH_Net_HO_Bcst_HO_Notify.request | ( |
| --- | --- |
| | DestinationIdentifier, |
| | HandoverDirection, |
| | TargetProgramDescription, |
| | TargetNetworksInfoList, |
| | LinkActionExecutionDelay, |
| | LinkActionsList |
| | ) |

TABLE 2

| MIH_Net_HO_Bcst_HO_Notify.indication | ( |
| --- | --- |
| | SourceIdentifier, |
| | HandoverDirection, |
| | TargetProgramDescription, |
| | TargetNetworksInfoList, |
| | LinkActionExecutionDelay, |
| | LinkActionsList |
| | ) |

The MIH_SAP (Service Access Point) Primitives for sending and receiving an MIH protocol message in Tables 1 and 2 may include at least one of handover direction information (HandoverDirection), information on the corresponding broadcast content (TargetProgramDescription), selected broadcast network information (TargetNetwroksInfoList), link action execution time information (LinkActionExecutionDelay, see IEEE Std 802.21-2008), and link action list information (LinkActionList, see IEEE Std 802.21-2008). Here, the handover direction information (HandoverDirection) indicates whether a handover is a handover from a communication network to a broadcast network or a handover from a broadcast network to a communication network. The selected broadcast network information (TargetNetwroksInfoList) indicates a list of selected broadcast networks and service provision information. The MIH command message can be multicast to a plurality of terminals. The MIH protocol message transmitted through the MIH_SAP primitives of Tables 1 and 2 is transmitted via a multicast session to the MIH users of the terminals 560 joining the corresponding multicast session.

Hereupon, the terminals 560 connect to the broadcast network, and, upon receiving the corresponding broadcast content over the broadcast network, leave the multicast session of the communication network. If the terminals 560 are unable to connect to the broadcast network or unable to receive the corresponding broadcast content over the broadcast network, the terminals can continue to receive the corresponding broadcast content over the communication network.

Figure 7:
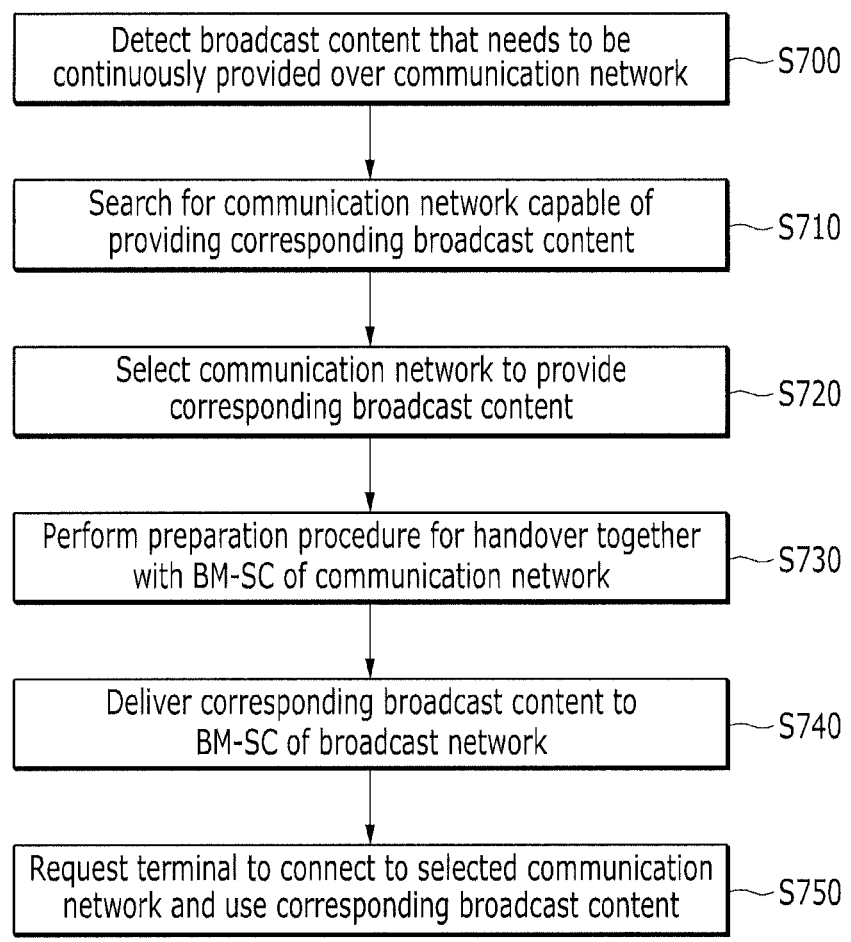
FIG. 7 is a flowchart showing a method of handover from a broadcast network to a communication network according to one exemplary embodiment of the present invention when a system supporting 3GPP MBMS (Multimedia Broadcast/Multicast Service) is used as the communication network, a DVB-IPDC (IP Datacasting) system is used as the broadcast network, and the communication network and the broadcast network support the IEEE 802.21 MIH (Media Independent Handover) function.

FIG. 7 is a flowchart showing a method of handover from a broadcast network to a communication network according to one exemplary embodiment of the present invention when a system supporting 3GPP MBMS (Multimedia Broadcast/Multicast Service) is used as the communication network, a DVB-IPDC (IP Datacasting) system is used as the broadcast network, and the communication network and the broadcast network support the IEEE 802.21 MIH (Media Independent Handover) function.

Referring to FIG. 7, the SA 530 determines whether there is any broadcast content that has been forcibly ended in the broadcast network and needs to be continuously provided over the communication network (S700), and searches for a communication network capable of providing the corresponding broadcast content (S710). In one example, the SA 530 can obtain information about surrounding communication networks from a 3GPP ANDSF (Access Network Discovery Support Functions) server. In another example, the SA 530 can obtain information about surrounding communication networks from an MIH information server. The information about the surrounding communication networks includes a list of communication networks which are providing the corresponding broadcast content or planning to transmit it later.

The SA 530 selects an appropriate communication network to provide the corresponding broadcast content from a received list of surrounding communication networks (S720). The SA 530 can send an inquiry message for handover to the BM-SC 520, and select an appropriate communication network with reference to a response message received from the BM-SC 520.

The SA 530 performs a preparation procedure for handover, together with the BM-SC 520 of the selected communication network, through the control interface (S730). For example, information required for the terminal 560 to receive the corresponding broadcast content can be transmitted to the terminal 560 through a service announcement. Afterwards, the SA 530 delivers the corresponding broadcast content to the BM-SC 520 of the selected communication network through the data interface (S740).

Then, the SA 530 requests the terminals 160 using the corresponding broadcast content over the broadcast network to connect to the selected communication network and continue to watch the corresponding broadcast content (S750).

An example of a request message includes using an MIH protocol message, and the following Table 1 or the following Table 2 shows an MIH_SAP (Service Access Point) Primitive.

The MIH_SAP (Service Access Point) Primitives for sending and receiving an MIH protocol message in Tables 1 and 2 may include at least one of handover direction information (HandoverDirection), information on the corresponding broadcast content (TargetProgramDescription), selected communication network information (TargetNetwroksInfoList), link action execution time information (LinkActionExecutionDelay, see IEEE Std 802.21-2008), and link action list information (LinkActionList, see IEEE Std 802.21-2008). Here, the handover direction information (HandoverDirection) indicates whether a handover is a handover from a communication network to a broadcast network or a handover from a broadcast network to a communication network. The selected communication network information (TargetNetwroksInfoList) indicates a list of selected communication networks and service provision information. The MIH command message can be multicast to a plurality of terminals. The MIH protocol message transmitted through the MIH_SAP primitives of Tables 1 and 2 is transmitted via a multicast session to the MIH users of the terminals 560 joining the corresponding multicast session.

Hereupon, the terminals 560 connect to the communication network, and receive the corresponding broadcast content over the communication network. If the terminals 560 have already been connected to the selected communication network, a separate connection procedure may not be needed.

The exemplary embodiments of the present invention are not only realized by the method and device, but are also realized by a program for realizing functions corresponding to the configurations of the exemplary embodiments of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for performing handover between a communication network and a broadcast network by a handover controller of a first network corresponding to either the communication network or the broadcast network, the method comprising:
   searching for a second network capable of providing the same broadcast content broadcasted over the first network;
   performing a handover preparation procedure between the communication network and the broadcast network with a handover controller of the second network;
   delivering the broadcast content broadcasted over the first network to the handover controller of the second network; and
   sending a message requesting a terminal to watch, over the second network, the broadcast content broadcasted over the first network.

2. The method of claim 1, wherein the performing of the preparation procedure comprises:
   sending, to the handover controller of the second network, a first message inquiring whether the second network can provide the broadcast content broadcasted over the first network and whether there are available network resources in the second network;
   receiving, in response to the first message, a second message including information on whether the broadcast content can be provided and whether there are the available network resources;
   sending, with reference to the second message, a third message requesting the handover controller of the second network to prepare for delivering the broadcast content; and
   receiving, in response to the third message, a fourth message including information required for the terminal to receive the broadcast content over the second network.

3. The method of claim 2, wherein,
   when there are a plurality of searched second networks,
   the sending of the first message comprises sending the first message to handover controllers of the plurality of second networks, and
   the sending of the third message comprises selecting at least one of the plurality of second networks with reference to the second message, and
   sending the third message to the handover controller of the at least one selected second network.

4. The method of claim 2, wherein the third message comprises information on a content providing server that provides the broadcast content.

5. The method of claim 2, wherein the information required to receive the broadcast content comprises information on network resources allocated on the broadcast content in the second network.

6. The method of claim 1, wherein, when there are a plurality of terminals, the request message is transmitted to the plurality of terminals according to a multicast or broadcast transmission scheme.

7. The method of claim 1, wherein,
   when the first network is the communication network, the second network is the broadcast network, and
   when the first network is the broadcast network, the second network is the communication network.

8. A method for performing handover between a communication network and a broadcast network by a handover controller of a first network corresponding to either the communication network or the broadcast network, the method comprising:
   receiving, from a handover controller of a second network, a first message inquiring whether the first network can provide the same broadcast content as the second network broadcast and whether there are available network resources in the first network;
   sending, in response to the first message, a second message including information on whether the broadcast content can be provided and whether there are the available network resources;
   receiving, from the handover controller of the second network, a third message requesting preparation for delivering the broadcast content;
   sending, in response to the third message, a fourth message including information required for a terminal to receive the broadcast content to the handover controller of the second network;
   receiving the broadcast content delivered from the handover controller of the second network; and
   providing the broadcast content to the terminal.

9. The method of claim 8, wherein the fourth message comprises information on network resources allocated such that the first network provides the broadcast content.

10. The method of claim 9, wherein, when other broadcast content than the broadcast content broadcasted over the second network is currently provided through the allocated resources, the fourth message further comprises an expected ending time of the different broadcast content.

11. The method of claim 8, wherein, when the first network is the communication network, the second network is the broadcast network, and when the first network is the broadcast network, the second network is the communication network.

12. A handover controller of a first network corresponding to either a communication network or a broadcast network, which performs handover between the communication network and the broadcast network, comprising:
- a broadcast content detector for detecting broadcast content to be handed over to a second network;
- a second network selector for selecting at least one second network capable of providing the broadcast content with reference to information on whether the broadcast content received from a neighboring second network can be provided and information on whether there are available resources; and
- a transceiver for transmitting a preparation request message for handover to the at least one second network and transmitting a message requesting a terminal to watch the broadcast content over the at least one second network.

13. The handover controller of claim 12, wherein the transceiver transmits, to the second network in the vicinity, a message inquiring whether the broadcast content can be provided and whether there are available network resources, and receives, from the a neighboring second network, a response message including information whether the broadcast content can be provided and whether there are available network resources.

14. The handover controller of claim 12, wherein the preparation request message comprises information on a content providing server that provides the broadcast content.

15. The handover controller of claim 12, wherein the transceiver further receives, in response to the preparation request, information required for the terminal to receive the broadcast content.

16. The handover controller of claim 15, wherein the information required to receive the broadcast content comprises information on network resources such that the second network provides the broadcast content.

17. The handover controller of claim 16, wherein, when different broadcast content is currently provided through the network resources, the information required to receive the broadcast content further comprises an expected ending time of the different broadcast content.

18. The handover controller of claim 12, wherein, when there are a plurality of terminals, the request message is transmitted to the plurality of terminals according to a multicast or broadcast transmission scheme.

19. The handover controller of claim 12, wherein,
when the first network is the communication network, the second network is the broadcast network, and
when the first network is the broadcast network, the second network is the communication network.

* * * * *